United States Patent
Allouche et al.

(10) Patent No.: US 12,164,575 B1
(45) Date of Patent: Dec. 10, 2024

(54) DYNAMIC COMPUTER-BASED INTERNET PROTOCOL CLASSIFICATION

(71) Applicant: International Business Machines Corporation, Armonk, NY (US)

(72) Inventors: Yair Allouche, Dvira (IL); Yoav Keissar, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/420,255

(22) Filed: Jan. 23, 2024

(51) Int. Cl.
  G06F 16/00    (2019.01)
  G06F 16/906   (2019.01)
  G06F 18/243   (2023.01)
  H04L 61/5007  (2022.01)

(52) U.S. Cl.
  CPC ...... *G06F 16/906* (2019.01); *G06F 18/24323* (2023.01); *H04L 61/5007* (2022.05)

(58) Field of Classification Search
  CPC .................................................. G06F 18/24323
  See application file for complete search history.

(56) References Cited

U.S. PATENT DOCUMENTS

| 10,742,669 | B2  | 8/2020  | Takahashi |
| 2003/0131116 | A1* | 7/2003 | Jain ......................... H04L 69/32 |
| | | | 709/230 |
| 2013/0346202 | A1 | 12/2013 | Kouladjie |
| 2022/0086122 | A1 | 3/2022  | Therani |

FOREIGN PATENT DOCUMENTS

| CN | 115086411 A | 9/2022 |
| JP | 2021527276 A | 10/2021 |

OTHER PUBLICATIONS

Xuan et al., "APT attack detection based on flow network analysis techniques using deep learning," Journal of Intelligent & Fuzzy Systems, 2020, pp. 1-17.

* cited by examiner

Primary Examiner — Ajith Jacob
(74) Attorney, Agent, or Firm — Joseph P. Curcuru

(57) ABSTRACT

In an approach to improve internet protocol (IP) classification, embodiments of the present invention classify, by an IP classifier, a set of samples from a given IP range. Further, embodiments utilize the IP classifier to predict whether an IP address is dynamic or static and apply, by a client computer, an error-correction tree to the set of samples. Additionally, embodiments split, by the client computer, the range into two or more sub-ranges of a smaller size in response to determining a classification certainty does not exceed or is not within a predetermined threshold.

20 Claims, 4 Drawing Sheets

DYNAMIC COMPUTER-BASED INTERNET PROTOCOL CLASSIFICATION

BACKGROUND OF THE INVENTION

The present invention relates generally to network traffic analysis, and more particularly to the field of improving network traffic analysis through dynamic internet protocol (IP) classification.

Network traffic analysis (NTA) is the process of collecting and examining network data to understand and improve the performance of your network. Network traffic analysis can allow you to identify bottlenecks in your network causing slowdowns or may soon impact quality of service for end users. NTA solutions continuously analyze network telemetry and/or flow records (like NetFlow). They use a combination of machine learning and behavioral analytics to generate a baseline that reflects what normal network behavior looks like for the organization. When abnormal traffic patterns or irregular network activities are detected, these tools alert your security team to the potential threat.

In addition to monitoring north-south traffic that crosses the enterprise perimeter, NTA solutions monitor east-west communications by analyzing network traffic or flow records. NTA solutions can analyze all the entities or devices that make up your network—whether they are managed or unmanaged. NTA solutions ingest telemetry from multiple network devices like routers, switches, and firewalls to determine what "normal" behavior for these devices looks like and how parts of your network are being accessed and by whom. Everything touches the network, so this visibility extends all the way from headquarters to branch offices, data centers, roaming users, and smart devices. Whether you are on-premises, in the cloud, or some combination, NTA solutions can give you much needed visibility and context into what is happening on your network.

SUMMARY

Embodiments of the present invention disclose a computer-implemented method, computer system, and computer program product, the computer-implemented method comprising: classifying, by an internet protocol (IP) classifier, a set of samples from a given IP range; utilizing the IP classifier to predict whether an IP address is dynamic or static; applying, by a client computer, an error-correction tree to the set of samples; and responsive to determining a classification certainty does not exceed or is not within a predetermined threshold, splitting, by the client computer, the range into two or more sub-ranges of a smaller size, wherein the two sub-ranges may be classified in a recursive manner.

Embodiments of the present invention further disclose training the IP classifier, wherein the IP classifier comprise feature extraction and model training, and building the error-correction tree, wherein the error-correction tree is a recursive process utilized to improve the classifier predictions. Embodiments of the present invention disclose collecting, by the IP classifier, network flows data (data) from a flows database, aggregating the flows by a predetermined pivot, and utilizing a set of features to yield the IP classifier, wherein the set of features comprise: network name, IP, timestamp, number of destination IPs, number of source ports, number of destination ports, sum of source packets, sum of destination packets, application name, and flow direction. Embodiments of the present invention disclose applying the feature extraction process, wherein the feature extraction process comprises: each record's application name is replaced with application category, from a predetermined list, wherein the predetermined list comprises: web, miscellaneous, data transfer, remote access, internet control message protocol (ICMP), network management, and peer-to-peer (p2p) network, aggregating the records by IP address, and summing the number of destination IPs, the number of source ports, the number of destination ports fields, and adding mean and variance of the packets fields by each application.

Embodiments of the present invention further disclose, enabling classifying IP addresses based on network telemetry. Embodiments of the present invention disclose responsive to determining the classification certainty of the given IP range is definite, adding the classification to a mapping of IP addresses. Embodiments of the present invention disclose defining a cost function, and determining the splitting is decreasing the given IP range.

DETAILED DESCRIPTION

Figure 1A:
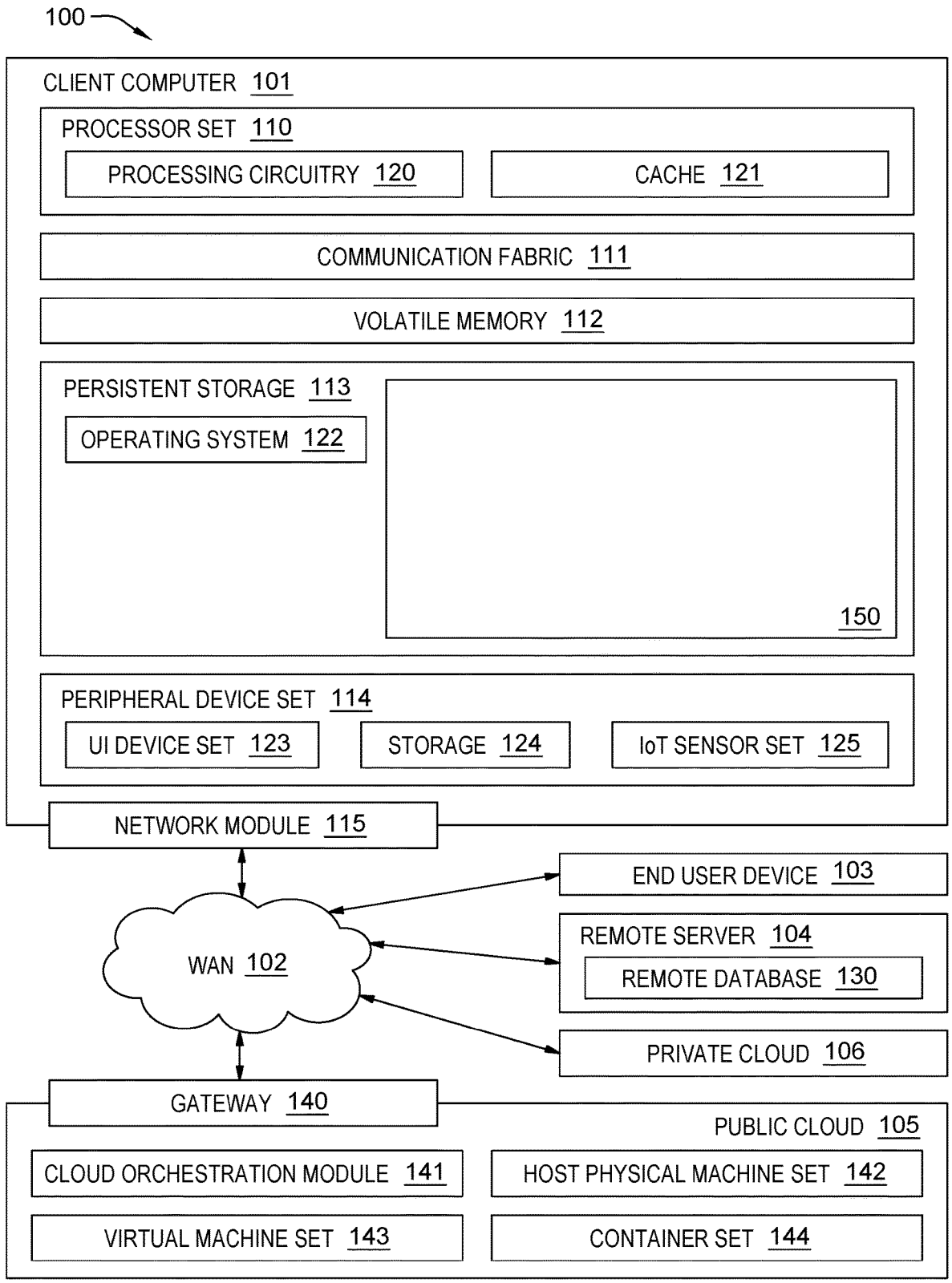
FIG. 1A is a functional block diagram illustrating a distributed data processing environment, a program, in accordance with an embodiment of the present invention.

According to an aspect of the invention, there is a provided computer-implemented method, computer system, and computer program product to classify, by an internet protocol (IP) classifier, a set of samples from a given IP range, utilize the IP classifier to predict whether an IP address is dynamic or static, apply, by a client computer, an error-correction tree to the set of samples, and split, by the client computer, the range into two or more sub-ranges of a smaller size in response to determining a classification certainty does not exceed or is not within a predetermined threshold, wherein the two sub-ranges may be classified in a recursive manner. The entire aspect of the invention, detailed above, might cause improved IP classification and IP mapping based on fully passive network monitoring.

According to an aspect of the invention, the provided computer-implemented method, computer system, and computer program product may further comprise training the IP classifier, wherein the IP classifier comprise feature extraction and model training, and building the error-correction tree, wherein the error-correction tree is a recursive process utilized to improve the classifier predictions. In embodiments, the training of the IP classifier and the building of the error-tree may, at least, advantageously increase the efficiency and accuracy of dynamic IP classification and IP mapping.

According to an aspect of the invention, the provided computer-implemented method, computer system, and computer program product may further comprise collecting, by the IP classifier, network flows data (data) from a flows database, aggregating the flows by a predetermined pivot, and utilizing a set of features to yield the IP classifier, wherein the set of features comprise: network name, IP, timestamp, number of destination IPs, number of source ports, number of destination ports, sum of source packets, sum of destination packets, application name, and flow direction. In embodiments, the collecting of network flows, aggregation of the network flows, and utilization of the set of features to yield the IP classifier may, at least, advantageously increase the efficiency and accuracy of dynamic IP classification and IP mapping.

According to an aspect of the invention, the provided computer-implemented method, computer system, and computer program product may further apply the feature extraction process, wherein the feature extraction process comprises: each record's application name is replaced with application category, from a predetermined list, wherein the predetermined list comprises: web, miscellaneous, data transfer, remote access, internet control message protocol (ICMP), network management, and peer-to-peer (p2p) network, aggregating the records by IP address, and summing the number of destination IPs, the number of source ports, the number of destination ports fields, and adding mean and variance of the packets fields by each application. In embodiments, the applying of the feature extraction process, aggregation of the records by the IP address, and the summing of the number of destination IPs, the number of source ports, the number of destination ports fields, and adding of the mean and variance of the packets fields by each application may, at least, advantageously increase the efficiency and accuracy of dynamic IP classification and IP mapping.

According to an aspect of the invention, the provided computer-implemented method, computer system, and computer program product may further enable classifying IP addresses based on network telemetry. In embodiments, enabling of classifying IP addresses based on network telemetry may, at least, advantageously increase the efficiency and accuracy of dynamic IP classification and IP mapping.

According to an aspect of the invention, the provided computer-implemented method, computer system, and computer program product may further integrate the IP classification into the mapping of the IP addresses in response to determining the classification certainty of the given IP range is definite. In embodiments, the integration the IP classification into the mapping of the IP addresses may, at least, advantageously increase the efficiency and accuracy of dynamic IP classification and IP mapping.

In embodiments, the provided computer-implemented method, computer system, and computer program product splitting further comprises defining a cost function, and determining the splitting is decreasing the given IP range. In embodiments, defining a cost function and determining the splitting is decreasing the given IP range may, at least, advantageously increase the efficiency and accuracy of dynamic IP classification and IP mapping.

Embodiments of the present invention recognize that most cyber-attacks traverse the network in some way. Therefore, embodiments of the present invention recognize that analysis of network traffic can help enterprises detect suspicious activities and breaches which might be missed with other approaches. Embodiments of the present invention recognize that current common solutions for network monitoring employ the use of rule-based approaches to detect suspicious network activity. Unfortunately, with the increasing sophistication of threat actors and their ability to imitate normal network behavior, embodiments of the present invention recognize that the effectiveness of rule-based approaches is rapidly diminishing. Embodiments of the present invention recognize that these traditional approaches can no longer be trusted to most attacks. Responding to this gap, embodiments of the present invention recognize that a new field called Network Traffic Analysis (NTA) has emerged and the market is responding quickly. Embodiments of the present invention recognize that NTA solutions offer a combination of machine learning, advanced analytics, and rule engines to detect suspicious activities on enterprise networks. This hybrid approach allows the detection of known along with unknown zero-day threats.

Embodiments of the present invention recognize that IT and business personnel are constantly adding and removing end-user devices and new systems to support business needs and that cloud transformation and agile delivery models have exacerbated this problem. Therefore, embodiments of the present invention recognize that accurately identifying everything that is connected to the infrastructure should be a critical concern since each application and system is part of the potential attack surface that can be leveraged as a beachhead for incursion or data exfiltration.

Embodiments of the present invention improve the art and solve at least the problems stated above by providing and/or executing a passive dynamic internet protocol (IP) classification relaying only on network monitoring logs (such as NetFlow or IPFIX). That is, a deployment of the presented solution requires only a passive monitoring of the network by tapping the network infrastructure (router and switched) and is not requiring the expensive integration with asset database (DB) or dynamic host configuration protocol (DHCP) servers. Further, embodiments of the present invention improve the art and solve at least the problems stated above by classifying IP addresses based on network telemetry (e.g., NetFlow/IPFIX). More specifically, embodiments of the present invention improve the art and solve at least the problems stated above by (i) utilizing an IP classifier trained to predict if an IP address is dynamic or static and (ii) enhancing the accuracy predictions of the classifier by employing an error-correction (thereby leveraging IP range allocation information, wherein the effectiveness of IP address classification is improved enabling classifying IP addresses based on network telemetry.

Implementation of embodiments of the invention may take a variety of forms, and exemplary implementation details are discussed subsequently with reference to the Figures (i.e., FIG. 1A-FIG. 3).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, a virtual reality headset, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1A. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In various embodiments, component 150 improves network traffic analysis through dynamic internet protocol (IP) classification based on passive network monitoring. In various embodiments, component 150 maps the enterprise IP ranges into dynamic/static allocations. In various embodiments, not depicted in FIG. 1A, component 150 comprises an IP classifier. Component 150 may (i) train an IP classifier, which may be utilized to predict the dynamic/static property for a given IP, (ii) build an error-correction tree, wherein the error-correction tree is utilized to improve the classifier predictions, and (iii) execute enterprise network range mapping (network IP range mapping) to classify each IP range by its corresponding classified IP. In various embodiments, component utilizes the network IP range mapping to map the outputs from the IP classifier and the error-correction trec.

In various embodiments, the IP classifier comprises two phases: (i) feature extraction, and (ii) model training. Regarding feature extraction, IP classifier collects network flows data (data) from a flows database. In various embodiments, the flows are aggregated by a predetermined pivot. For example, by hour and IP address. In various embodiments, component 150 may utilize a set of features that yield an accurate and stable IP classifier, wherein the set of features comprise, but are not limited to, network name, IP, timestamp, the number of destination IPs, the number of source ports, the number of destination ports, sum of source packets, sum of destination packets, application name, and flow direction. In various embodiments, component 150 applies a feature extraction process, wherein the feature extraction process comprises: each record's application name is replaced with application category, from a predetermined list, wherein the predetermined list comprises, but is not limited to: web, miscellaneous, data transfer, remote access, internet control message protocol (ICMP), network management, and peer-to-peer (p2p) network. Component 150 may aggregate the records (e.g., communication records) by IP address, and summing the number of destination IPs, the number of source ports, the number of destination ports fields, and adding mean and variance of the packet's fields by each application. Communication records comprise the communication metadata (also known as flows). Flow resounds comprises attributes, such as but not limited to, source and destination IP address, source and destination ports, protocol, and uplink/downlink (UL/DL) packet rate.

In various embodiments, generates labeled data set(s) and applies the IP classification to the labeled data set(s). In various embodiments, responsive to generating labeled datasets with extracted features, component 150 implements classification techniques and utilize predetermined classifiers, and a robust machine learning library. Component 150 may utilize the feature vectors and label each record with an IP label. For example, component 150 may utilize an error-tree classifier that is implemented by a Scikit-Learn module before the training the data is normalized using Standard Scaler implemented by the Scikit-Learn module.

In various embodiments, the error-correction tree is a recursive process designed to improve the accuracy of the IP classifier. Meaning IPs in the same IP range tend to have the same classification. The Error-correction tree may identify the IP range. In various embodiments, for a given IP or a given IP range, component 150 identifies and/or receives a range classification, wherein the range classification is a predefined size. To classify the range, component 150 may check and/or analyze the classifications of the IPs, wherein the label of the range may be determined if the classification certainty exceeds or is within a predetermined threshold. If the classification certainty does not exceed or is not within the predetermined threshold, then component 150 will split the range into two or more sub-ranges of a smaller size. The two sub-ranges may be classified in a recursive manner. When a range containing the IP is classified with certainty the classification will propagate downward to the IP.

For example, for IP address 9.148.50.5, and a range size of 24, component 150 checks the IP addresses (Ips) in range 9.148.50.0/24. In this example, if more than 65% of IPs in that range are dynamic then component 150 classifies 9.148.50.5 as dynamic; however, if less than 35% of IPs are static then component 150 classifies 9.148.50.5 as static. In a case when the dynamic ratio is 35%-65% component 150 marks the range inconclusive and repeats the process of classifying on a smaller (in 2 bits) range, 9.148.50.0/26, wherein the thresholds are predetermined and configurable.

In various embodiments, to classify an IPs range or to split the IPs range into two or more smaller ranges, component 150 defines a cost function and determines if the splitting is decreasing the cost (i.e., improving the cost function). To define the cost function, component 150 utilizes the following variables: S is the set of all ranges classified, $S_i \in S$ is some classified range, and $s_{i,j} \in S_i$ is an IP classification of specific range to construct the cost function depicted by Equation 1. When an error is given or identified component 150 utilizes Equation 2.

$$\text{Cost}(S) = \Sigma_{s_i \in s} \text{Error}(S_i) + k \cdot |S| \qquad \text{Equation 1:}$$

$$\text{Error}(S_i) = \frac{|\{s_{i,j} | s_{i,j} \neq \text{majority}(S_i)\}|}{|S_i|} \qquad \text{Equation 2}$$

The cost function is the summing of error rates of all ranges, and a penalization over the number of classified ranges. In various embodiments, the goal is that the splitting will occur only in cases where it lowers the error significantly, and not just splitting every range. For example, if component 150 identifies, prior to splitting, that there will be a 50% misclassification of the IP range and that after splitting there will be a 0% chance of misclassification then component 150 will split the IP range. In some embodiments, component 150 issues a responsive prompt to the user that prompts the user to confirm the split, wherein component 150 is responsive to the user's selection. In another example, if component 150 identifies, prior to splitting, that there will be a 33% misclassification of the IP range and that after splitting there will still be a 33% chance of misclassification of each sub-range then component 150 recommend not to split the IP range which is conducive to the utilization of k·|S| in the cost function.

In various embodiments, to execute range-mapping, component 150 utilizes the IP classifier and the error-correction tree. Component 150 may map the IPs range into dynamic/static sections for a given enterprise network. Component 150 may work with a pre-trained IP Classifier. In various embodiments, for a given ranges of IPs and a minimal range size for classification component 150 divides the wanted ranges into ranges of a wanted size, wherein the wanted ranges and wanted size are each a predetermined value. For example, wanted ranges are 9.148.0.0/16 and 9.147.0.0/16, and the minimal range size for classification is 24, then the ranges that will be classified are 9.148.0.0/24, 9.148.1.0/24, . . . , 9.148.255.0/24 and 9.147.0.0/24, 9.147.1.0/24, . . . , 9.147.255.0/24. In various embodiments, for each iteration, component 150 queries for wanted ranges, from the flows database (e.g., QRadar), and aggregates the flows by a predetermined pivot (as described above). Component 150 may identify and classify each range. In various embodiments, if component 150 classifies a range as definite, wherein definite is a predetermined range and/or value, then component 150 adds the classification to the map. For example, if the definite value is more than 65% dynamic IPs or less than 35% of the IPs are misclassified and component 150 identifies that the dynamic IPs are more than 65% then component 150 will add the definite classification of the range to the map. However, in various embodiments, if component 150 identifies that the range is inconclusive/non-definite (e.g., more than 35% of the IPs are misclassified) then component 150 splits the range into two or more smaller ranges. For example, splitting 9.148.1.0/24 into 9.148.1.0/25 and 9.148.1.128/25, wherein component 150 will reattempt to classify them in the next iteration. In various embodiments, if no data over the range's IPs is collected then component 150 reattempts the actions stated a in the next iteration.

Figure 1B:
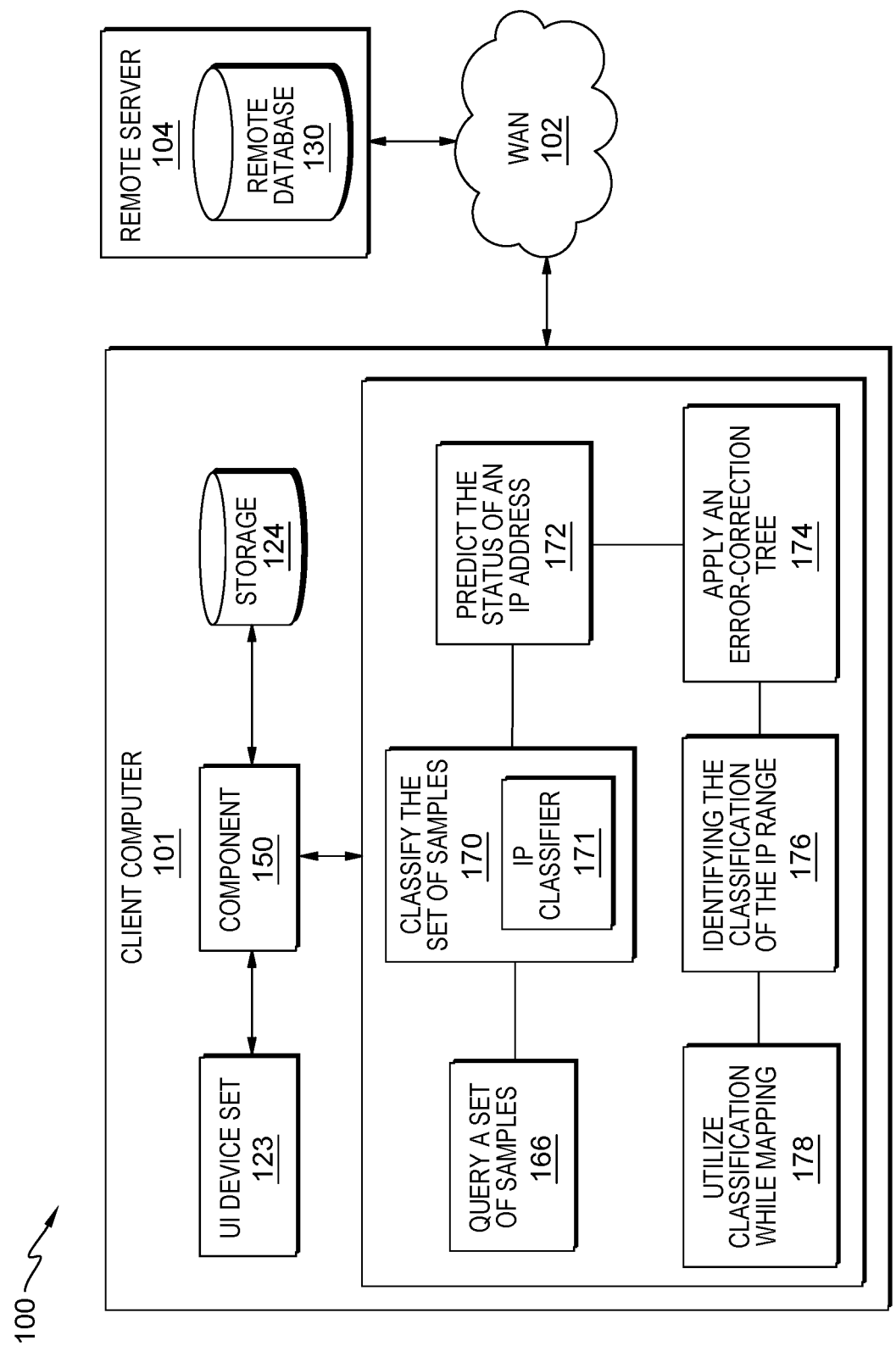
FIG. 1B illustrates a functional block diagram and operational steps of the program, on a server computer within the distributed data processing environment of FIG. 1A, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes client computer 101, and remote server 104 interconnected via WAN 102.

In the depicted embodiment, component 150 queries a set of IP samples (samples). component 150 queries a set of samples from a given IP range. In various embodiments, component 150 receives and/or retrieves a query set of samples from a predetermined IP range. In the depicted embodiment, component 150 classifies the set of samples 170. In various embodiments, component 150 classifies, via an IP classifier 171, the samples from the query. In the depicted embodiment, component 150 predicts the status of an IP address 172. In various embodiments, component 150 utilizes IP classifier 171 to predict if an IP address is either dynamic or static. In various embodiments, component 150 trains IP classifier 171, which is then utilized to predict the dynamic/static property for a given IP address and/or range of IP addresses. IP classifier 171 is trained using current IP samples, previously used and/or stored IP samples and associated metadata stored on storage 124 and/or remote database 130, and/or received predetermined training data via UI devices set 123.

In the depicted embodiment, component 150 applies an error-correction tree 174. In various embodiments, component 150 builds an error-correction tree, wherein the error-correction tree is utilized to improve IP classifier 171 predictions. In various embodiments, the error-correction tree is a recursive process designed to improve the accuracy of IP classifier 171. Meaning IPs in the same IP range tend to have the same classification. In various embodiments, component 150 may utilize the error-correction tree identify and/or classify an IP range.

In various embodiments, for a given IP or a given IP range, component 150 identifies and/or receives a range classification, wherein the range classification is a predefined size. To classify the range, component 150 may check and/or analyze the classifications of the IPs, wherein the label of the range may be determined if the classification certainty exceeds or is within a predetermined threshold. If the classification certainty does not exceed or is not within the predetermined threshold, then component 150 will split the range into two or more sub-ranges of a smaller size. The two sub-ranges may be classified in a recursive manner. When a range containing the IP is classified with certainty the classification will propagate downward to the IP.

In the depicted embodiment, component 150 utilizes the classification while mapping an IP. In various embodiments, to execute range-mapping, component 150 utilizes IP classifier 171 and the error-correction tree. Component 150 may map the IPs range into dynamic/static sections for a given enterprise network. In various embodiments, for a given ranges of IPs and a minimal range size for classification component 150 divides the wanted ranges into ranges of a wanted size, wherein the wanted ranges and wanted size are each a predetermined value. In various embodiments, for each iteration, component 150 queries for wanted ranges, from the flows database (e.g., QRadar), and aggregates the flows by a predetermined pivot (as described above). Component 150 may identify and classify each range. In various embodiments, if component 150 classifies a range as definite, wherein definite is a predetermined range and/or value, then component 150 adds the classification to the map.

Figure 2:
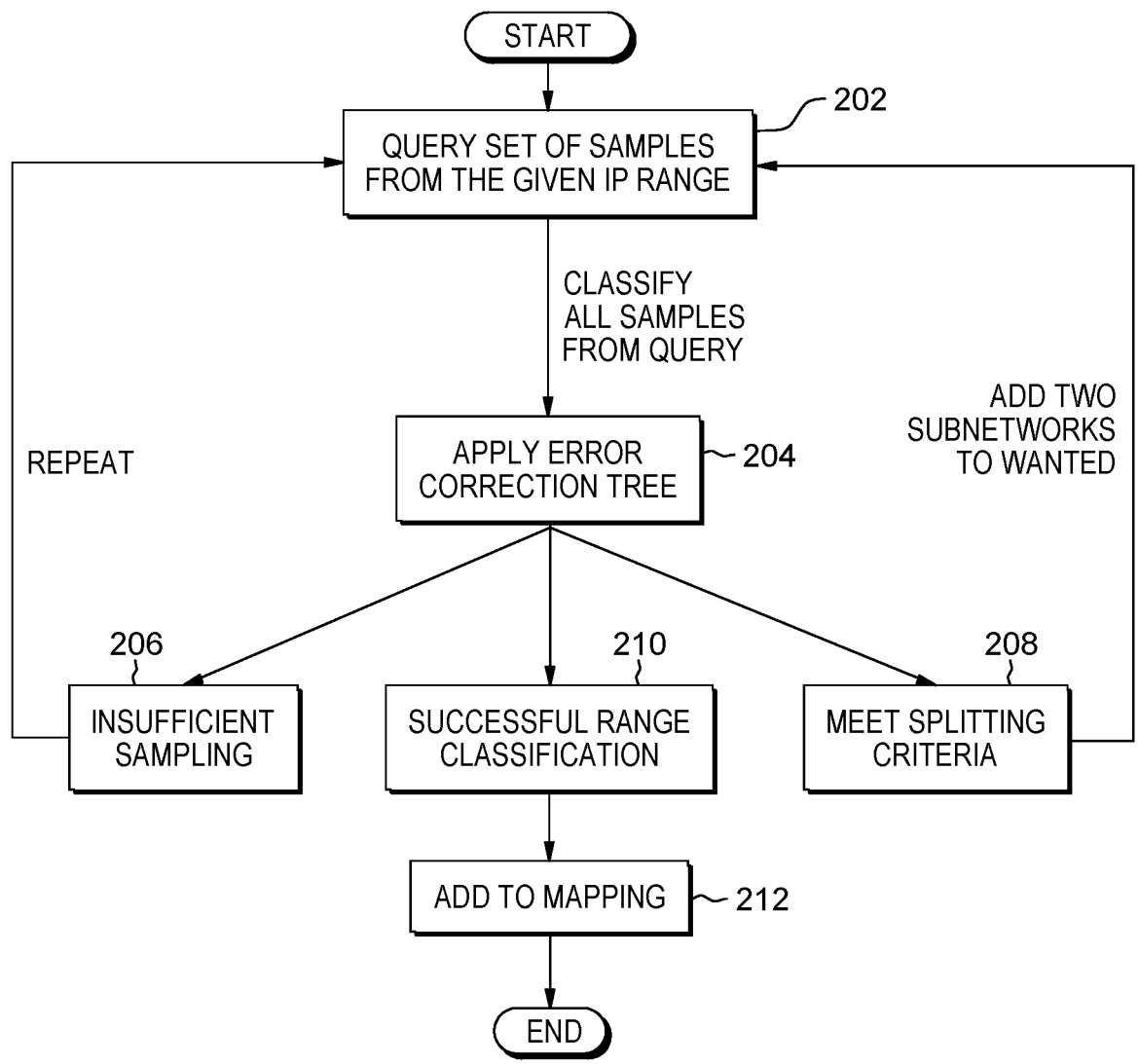
FIG. 2 illustrates operational steps of the program, on a server computer within the distributed data processing environment of FIG. 1A, for classifying IP addresses, in accordance with an embodiment of the present invention.

FIG. 2 illustrates operational steps of component 150, generally designated 500, in communication with client computer 101, remote server 104, private cloud 106, EUD 103, and/or public cloud 105, within distributed data processing environment 100, for classifying IP addresses, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In block 202, component 150 queries a set of samples from a given IP range. In various embodiments, component 150 receives and/or retrieves a query set of samples from a predetermined IP range. In various embodiments, component 150 classifies, via an IP classifier, the samples from the query.

In block 204, component 150 applies an error-correction tree. In various embodiments, component 150, via the error-correction tree, identifies the IP range. In various embodiments, for a given IP, component 150 identifies and/or receives a range classification, wherein the range classification is a predefined size. To classify the range, component 150 may check and/or analyze the classifications of the IPs, wherein the label of the range may be determined if the classification certainty exceeds or is within a predetermined threshold. If the classification certainty exceeds or is within the predetermined threshold, then component 150 advances to block 210. If the classification certainty does not exceed or is not within the predetermined threshold, then component 150 will advance to block 208. In the depicted embodiment, if component 150 determines that the sampling is insufficient then component 150 advances to block 206.

In block 206, component 150 identifies the set of IP samples (samples) as insufficient within a given/predetermined range. In various embodiments, component 150 identifies the set of samples as insufficient and repeats block 202 and 204. In various embodiments, some IPs are inactive (e.g., user machine powered down or hibernating overnight or over the weekend). In this instance, component 150 monitors the network at different time slots to traffic the unclassified IPs.

In block 208, component 150 splits the range. In various embodiments, if the classification certainty does not exceed or is not within the predetermined threshold then component 150 will split the range into two or more sub-ranges of a smaller size. The two sub-ranges may be classified in a recursive manner. When a range containing the IP is classified with certainty the classification will propagate downward to the IP. In various embodiments, component 150 adds two or more subnetworks to the wanted (i.e., requested) ranges.

In block 210, component 150 identifies and classifies the IP range as successful. In various embodiments, component 150 may check and/or analyze the classifications of the IPs, wherein the label of the range may be determined if the classification certainty exceeds or is within a predetermined threshold. An IP range is classified as successful if the classification certainty exceeds or is within a predetermined threshold.

In block 212, component 150, component 150 adds the classification to the map. In various embodiments, responsive to identifying a successful range classification component 150 utilizes the network IP range mapping to map the outputs from the IP classifier and the error-correction tree. In various embodiments, component 150 executes enterprise network range mapping (network IP range mapping) to classify each IP range by its corresponding classified IP. In various embodiments, to execute range-mapping, component 150 utilizes the IP classifier and the error-correction tree. Component 150 may map the IPs range into dynamic/static sections for a given enterprise network. Component 150 may work with a pre-trained IP Classifier. In various embodiments, for a given ranges of IPs and a minimal range size for classification component 150 divides the wanted ranges into ranges of a wanted size, wherein the wanted ranges and wanted size are each a predetermined value. In various embodiments, component 150 creates an IP map and utilizes the classification to enhance the generated IP map. Component 150 may apply the IP mapping to computer-based artificial intelligence (AI) analytic applications (e.g., behavioral modeling).

Figure 3:
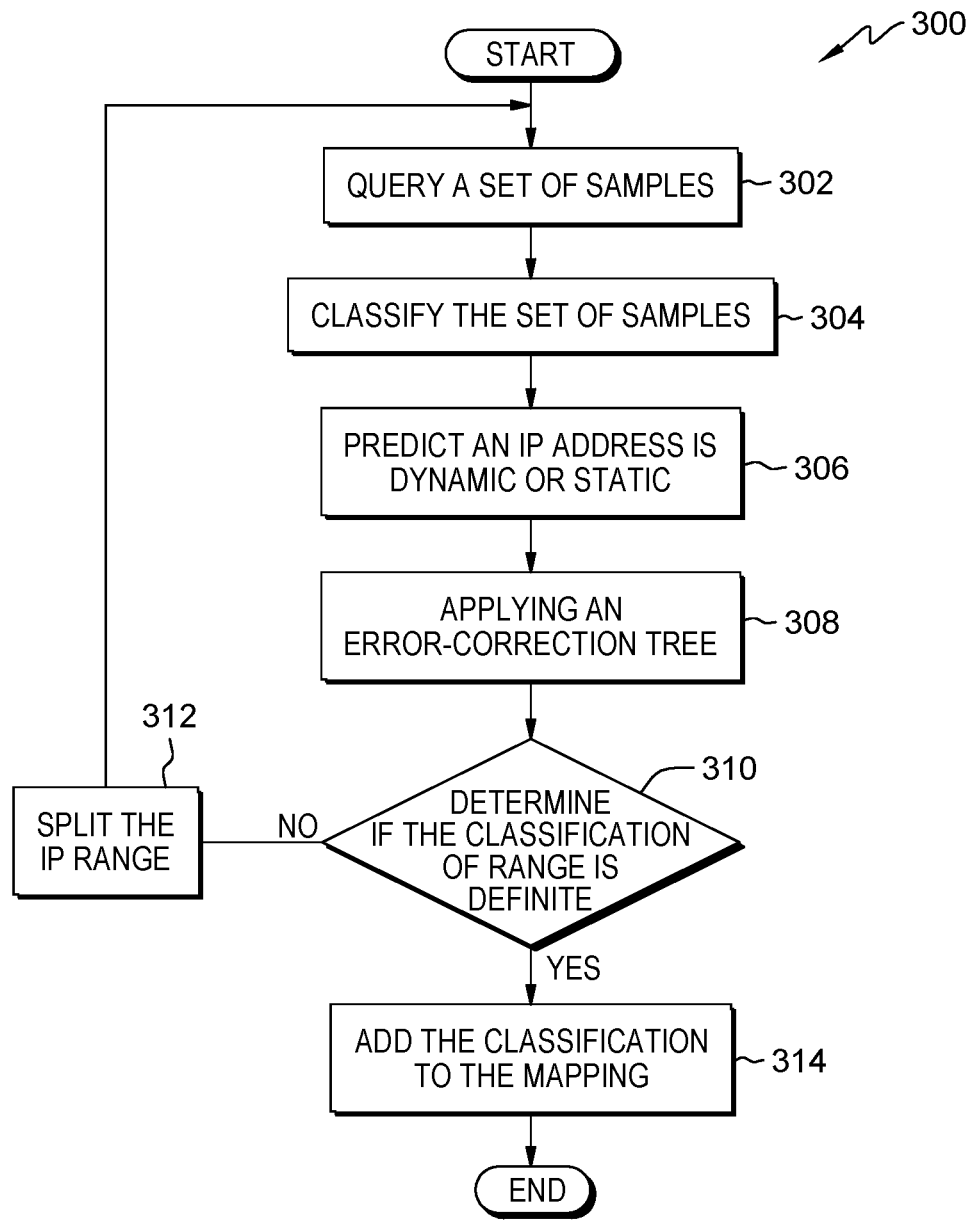
FIG. 3 illustrates operational steps of the program, on a server computer within the distributed data processing environment of FIG. 1A, for classifying IP addresses based on network telemetry, in accordance with an embodiment of the present invention.

FIG. 3 illustrates operational steps of component 150, generally designated 500, in communication with client computer 101, remote server 104, private cloud 106, EUD 103, and/or public cloud 105, within distributed data processing environment 100, for classifying IP addresses based on network telemetry, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In block 302, component 150 queries a set of samples from a given IP range. In various embodiments, component 150 receives and/or retrieves a query set of samples from a predetermined IP range.

In block 304, component 150 classifies the set of samples. In various embodiments, component 150 classifies, via an IP classifier, the IP samples (samples) from the query.

In block 306, component 150 predicts if an IP address is dynamic. In various embodiments, component 150 utilizes an IP classifier trained to predict if an IP address is dynamic or static. In various embodiments, component 150 trains the IP classifier, which is then utilized to predict the dynamic/static property for a given IP address and/or range of IP addresses.

In block 308, component 150 applies an error-correction tree. In various embodiments, component 150 builds an error-correction tree, wherein the error-correction tree is utilized to improve the classifier predictions. In various embodiments, component 150, via the error-correction tree, identifies the IP range. In various embodiments, for a given IP range, component 150 identifies and/or receives a range classification, wherein the range classification is a predefined size. To classify the range, component 150 may check and/or analyze the classifications of the IPs, wherein the label of the range may be determined if the classification certainty exceeds or is within a predetermined threshold (i.e., is definite).

In block 310, component 150 determines if the classification is definite. In the depicted embodiment if the classification certainty exceeds or is within the predetermined threshold (Yes block), then component 150 advances to block 314. If the classification certainty does not exceed or is not within the predetermined threshold (No block), then component 150 advances to block 312.

In block 312, component 150 splits the IP range (range). In various embodiments, if the classification certainty does not exceed or is not within the predetermined threshold then component 150 will split the range into two or more sub-ranges of a smaller size. The two sub-ranges may be classified in a recursive manner. When a range containing the IP is classified with certainty the classification will propagate downward to the IP address. In various embodiments, to classify an IPs range or to split the IPs range into two or more smaller ranges, component 150 defines a cost function and determines if the splitting is decreasing the range.

In block 314, component 150 adds the classification to the mapping. In various embodiments, responsive to identifying a successful range classification component 150 utilizes the network IP range mapping to map the outputs from the IP classifier and the error-correction tree. In various embodiments, component 150 executes enterprise network range mapping (network IP range mapping) to classify each IP range by its corresponding classified IP. In various embodiments, to execute range-mapping, component 150 utilizes the IP classifier and the error-correction tree. Component 150 may map the IPs range into dynamic/static sections for a given enterprise network. Component 150 may work with a pre-trained IP Classifier. In various embodiments, for a given ranges of IPs and a minimal range size for classification component 150 divides the wanted ranges into ranges of a wanted size, wherein the wanted ranges and wanted size are each a predetermined value.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
classifying, by an internet protocol (IP) classifier, a set of samples from a given IP range;
utilizing the IP classifier to predict whether an IP address is dynamic or static;
applying, by a client computer, an error-correction tree to the set of samples; and
responsive to determining a classification certainty does not exceed or is not within a predetermined threshold, splitting, by the client computer, the given IP range into two or more sub-ranges of a smaller size, wherein the two sub-ranges may be classified in a recursive manner.

2. The computer-implemented method of claim 1, further comprising:
training the IP classifier, wherein the IP classifier comprise feature extraction and model training; and
building the error-correction tree, wherein the error-correction tree is a recursive process utilized to improve the prediction of the IP classifier.

3. The computer-implemented method of claim 2, wherein the feature extraction comprises:
collecting, by the IP classifier, network flows data from a flows database;
aggregating the flows by a predetermined pivot; and
utilizing a set of features to yield the IP classifier, wherein the set of features comprise: network name, IP, timestamp, number of destination IPs, number of source ports, number of destination ports, sum of source packets, sum of destination packets, application name, and flow direction.

4. The computer-implemented method of claim 3, further comprising:
applying the feature extraction, wherein the feature extraction comprises: application name of a record is replaced with application category, from a predetermined list, wherein the predetermined list comprises: web, miscellaneous, data transfer, remote access, internet control message protocol (ICMP), network management, and peer-to-peer (p2p) network;
aggregating the records by the IP address; and
summing the number of destination IPs, the number of source ports, a number of destination ports fields, and adding mean and variance of packets fields by each application.

5. The computer-implemented method of claim 1, further comprising:
enabling classifying IP addresses based on network telemetry.

6. The computer-implemented method of claim 1, further comprising:
responsive to determining a classification certainty of the given IP range is definite, adding the classification to a mapping of IP addresses.

7. The computer-implemented method of claim 1, wherein the splitting further comprises:
defining a cost function; and
determining the splitting is decreasing the given IP range.

8. A computer system comprising:
one or more computer processors;
one or more computer readable storage devices;
program instructions stored on the one or more computer readable storage devices for execution by at least one of the one or more computer processors, the stored program instructions comprising:
program instructions to classify, by an internet protocol (IP) classifier, a set of samples from a given IP range;
program instructions to utilize the IP classifier to predict whether an IP address is dynamic or static;
program instructions to apply, by a client computer, an error-correction tree to the set of samples; and
responsive to determining a classification certainty does not exceed or is not within a predetermined threshold, program instructions to split, by the client computer, the range into two or more sub-ranges of a smaller size, wherein the two sub-ranges may be classified in a recursive manner.

9. The computer system of claim 8, further comprising:
program instructions to training the IP classifier, wherein the IP classifier comprise feature extraction and model training; and
program instructions to build the error-correction tree, wherein the error-correction tree is a recursive process utilized to improve the prediction of the IP classifier.

10. The computer system of claim 9, wherein the feature extraction comprises:
program instructions to collect, by the IP classifier, network flows data from a flows database;
program instructions to aggregate the flows by a predetermined pivot; and
program instructions to utilize a set of features to yield the IP classifier, wherein the set of features comprise: network name, IP, timestamp, number of destination IPs, number of source ports, number of destination ports, sum of source packets, sum of destination packets, application name, and flow direction.

11. The computer system of claim 10, further comprising:
program instructions to apply the feature extraction, wherein the feature extraction comprises: application name of a record is replaced with application category, from a predetermined list, wherein the predetermined list comprises: web, miscellaneous, data transfer, remote access, internet control message protocol (ICMP), network management, and peer-to-peer (p2p) network;
program instructions to aggregate the records by the IP address; and
program instructions to sum the number of destination IPs, the number of source ports, a number of destination ports fields, and add mean and variance of packets fields by each application.

12. The computer system of claim 8, further comprising:
program instructions to enable classifying IP addresses based on network telemetry.

13. The computer system of claim 8, further comprising:
responsive to determining a classification certainty of the given IP range is definite, program instructions to integrate the classification to a mapping of IP addresses.

14. The computer system of claim 8, wherein the splitting further comprises:
program instructions to define a cost function; and
program instructions to determine the splitting is decreasing the given IP range.

15. A computer program product comprising:
one or more computer readable storage devices and program instructions stored on the one or more computer readable storage devices, the stored program instructions comprising:
program instructions to classify, by an internet protocol (IP) classifier, a set of samples from a given IP range;
program instructions to utilize the IP classifier to predict whether an IP address is dynamic or static;
program instructions to apply, by a client computer, an error-correction tree to the set of samples; and
responsive to determining a classification certainty does not exceed or is not within a predetermined threshold, program instructions to split, by the client computer, the range into two or more sub-ranges of a smaller size, wherein the two sub-ranges may be classified in a recursive manner.

16. The computer program product of claim 15, further comprising:
 program instructions to training the IP classifier, wherein the IP classifier comprise feature extraction and model training;
 program instructions to build the error-correction tree, wherein the error-correction tree is a recursive process utilized to improve the prediction of the IP classifier;
 program instructions to collect, by the IP classifier, network flows data from a flows database;
 program instructions to aggregate the flows by a predetermined pivot; and
 program instructions to utilize a set of features to yield the IP classifier, wherein the set of features comprise: network name, IP, timestamp, number of destination IPs, number of source ports, number of destination ports, sum of source packets, sum of destination packets, application name, and flow direction.

17. The computer program product of claim 16, further comprising:
 program instructions to apply the feature extraction, wherein the feature extraction comprises: application name of a record is replaced with application category, from a predetermined list, wherein the predetermined list comprises: web, miscellaneous, data transfer, remote access, internet control message protocol (ICMP), network management, and peer-to-peer (p2p) network;
 program instructions to aggregate the records by the IP address; and
 program instructions to sum the number of destination IPs, the number of source ports, a number of destination ports fields, and add mean and variance of packets fields by each application.

18. The computer program product of claim 15, further comprising:
 program instructions to enable classifying IP addresses based on network telemetry.

19. The computer program product of claim 15, further comprising:
 responsive to determining a classification certainty of the given IP range is definite, program instructions to integrate the classification to a mapping of IP addresses.

20. The computer program product of claim 15, wherein the splitting further comprises:
 program instructions to define a cost function; and
 program instructions to determine the splitting is decreasing the given IP range.

* * * * *